(12) United States Patent
Seidel et al.

(10) Patent No.: US 7,030,180 B2
(45) Date of Patent: Apr. 18, 2006

(54) POLYCARBONATE COMPOSITIONS WITH REDUCED IRON CONTENT

(75) Inventors: Andreas Seidel, Dormagen (DE); Thomas Eckel, Dormagen (DE); Holger Warth, Dormagen (DE); Dieter Wittmann, Leverkusen (DE)

(73) Assignee: Bayer Aktiengesellschaft, Leverkusen (DE)

(*) Notice: Subject to any disclaimer, the term of this patent is extended or adjusted under 35 U.S.C. 154(b) by 605 days.

(21) Appl. No.: 10/054,276

(22) Filed: Jan. 22, 2002

(65) Prior Publication Data

US 2002/0132899 A1    Sep. 19, 2002

(30) Foreign Application Priority Data

Jan. 25, 2001 (DE) .................. 101 03 237

(51) Int. Cl.
*C08K 3/34* (2006.01)
*C08K 5/52* (2006.01)
*C08K 3/10* (2006.01)

(52) U.S. Cl. .............. 524/127; 524/140; 524/141; 524/435; 524/451

(58) Field of Classification Search ........... 524/127, 524/140, 141, 451, 435
See application file for complete search history.

(56) References Cited

U.S. PATENT DOCUMENTS

| 5,091,461 A | 2/1992 | Skochdopole ............... 524/493 |
| 5,162,419 A | 11/1992 | Pottier-Mketz et al. ..... 524/451 |
| 5,646,209 A * | 7/1997 | Furuta et al. ............... 524/252 |
| 5,961,915 A | 10/1999 | Toyouchi et al. ........... 264/572 |
| 6,239,219 B1 | 5/2001 | Breant et al. ............... 525/101 |

FOREIGN PATENT DOCUMENTS

| EP | 391 413 | 10/1990 |
| JP | 11-199768 | 7/1999 |
| WO | 96/06135 | 2/1996 |
| WO | 96/06136 | 2/1996 |
| WO | 98/51737 | 11/1998 |
| WO | 01/48074 | 7/2001 |
| WO | 01/48087 | 7/2001 |

* cited by examiner

*Primary Examiner*—Kriellion A. Sanders
(74) *Attorney, Agent, or Firm*—Joseph C. Gil; Aron Preis

(57) ABSTRACT

A polycarbonate composition containing inorganic material with an anisotropic particle geometry and with an iron content of less than about 100 ppm is disclosed. The composition is suitable for producing molded articles exhibiting improved mechanical properties both at ambient and low temperatures.

17 Claims, No Drawings

POLYCARBONATE COMPOSITIONS WITH REDUCED IRON CONTENT

FIELD OF THE INVENTION

The present invention relates to polycarbonate compositions (molding compositions) containing inorganic materials having improved mechanical properties, as well as molded articles produced from the compositions.

BACKGROUND OF THE INVENTION

Polycarbonate compositions containing inorganic materials are known. The inorganic materials are used in these compositions for example as reinforcing agents in order to increase the rigidity and tensile strength, to increase the dimensional stability under temperature fluctuations, to improve the surface properties or—in flame-resistant materials—also as flame-proofing synergists. Depending on the area of application and intended use inorganic materials may typically be used in concentrations of 0.5 to 30 wt. %. Both mineral and artificially obtained materials are used.

WO 98/51737 discloses polycarbonate/ABS compositions (PC/ABS) that contain 1 to 15 wt. % of a mineral filler such as talcum or wollastonite. The use of the types of fillers and concentrations described in this document point to an iron content of significantly more than 100 ppm in the composition.

The PC/ABS compositions disclosed in U.S. Pat. No. 5,091,461 contain talcum and uncalcined clay materials as inorganic fillers. The types of talcum used are characterized by a relatively high iron content.

The polycarbonate compositions of U.S. Pat. No. 5,162,419 and EP-A 0 758 003 give no indications of the iron content of the contained inorganic fillers. U.S. Pat. No. 5,961,915 discloses amorphous thermoplastic compositions that have been rendered flame-resistant with phosphoric acid esters and that contain glass chips or mica as inorganic filler. Such fillers or reinforcing agents often have relatively high iron concentrations.

JP-A 11/199768 discloses flame-resistant PC/ABS compositions containing talcum and phosphoric acid esters, in which different types of talcum are employed. This document gives no indication of the effect of the different types of talcum on the property spectrum of the blends produced therewith.

The addition of inorganic materials to PC/ABS blends leads in all cases, as expected, to a significant deterioration in the toughness of the molded article produced from the composition. Often the toughness achieved on adding inorganic materials is accordingly either insufficient for special applications or the amount of inorganic material employed is too small in order to be able to realise to a satisfactory degree the property advantages envisaged by its use.

It is therefore desirable to be able to provide polycarbonate compositions to which inorganic materials such as reinforcing agents having an anisotropic particle geometry have been added in a known manner in order to improve at least one material property, and which moreover are characterized by an improved toughness and/or low temperature toughness behavior compared to the prior art.

DETAILED DESCRIPTION OF THE INVENTION

This object is achieved by polycarbonate compositions (blends) containing inorganic material having an anisotropic particle geometry and with an iron content of less than about 100 ppm, preferably less than about 70 ppm and, according to a particularly preferred embodiment, less than about 50 ppm.

The present invention furthermore provides molded articles containing these compositions.

It has surprisingly been found that the reduction of the iron content in polycarbonate compositions or polymer blends that contain anisotropic inorganic materials leads to a marked improvement in the mechanical properties of the molded articles obtained therefrom. This is all the more surprising since it was assumed instead that the mechanical properties of polymer compositions containing inorganic material are influenced to a larger extent by the particle size and shape of the inorganic material.

Iron is introduced into polymeric compositions typically through polymers, fillers or reinforcing agents and other additives.

For example virtually all inorganic materials contain iron in more or less high concentration. Also, iron salts are used as process chemicals in certain polymer production processes, for example as redox initiator or as demulsifier in emulsion polymerisation processes. A complete removal of the iron from the polymer is not often undertaken within the scope of the working-up.

According to the invention particles having an anisotropic particle geometry are understood to be those particles whose average so-called aspect ratio—ratio of the largest and smallest particle measurements—is greater than 1, preferably greater than 2, and particularly preferably greater than about 5. Such particles are at least in the broadest sense planar or fibre-like. Such materials include for example talcum, other (alumino)silicates having a layered or fibre-type geometry such as bentonite, wollastonite, mica, kaolin, hydrotalcite, hectorite, montmorillonite as well as glass fibres, glass chips, carbon fibres and graphite.

The compositions according to the invention may contain, in addition to polycarbonates or polyester carbonates, also further polymeric constituents and conventional additives. Possible polymeric constituents are for example graft polymers of at least one vinyl monomer on one or more graft bases, thermoplastic vinyl (co)polymers, polyalkylene terephthalates, polyamides and further thermoplastic resins. Possible polymer additives are mold release agents, stabilizers, antioxidants, flame-proofing agents, dyes and pigments, antistatics, nucleating agents, anti-drip agents as well as organic and further inorganic fillers and reinforcing agents.

The polycarbonates/polyester carbonates as well as further possible constituents contained in the compositions according to the invention are illustrated hereinafter by way of example.

Component A

Suitable aromatic polycarbonates and/or aromatic polyester carbonates of component A according to the invention are known in the literature or can be produced by methods known in the literature (for the production of aromatic polycarbonates see for example Schnell, "Chemistry and Physics of Polycarbonates", Interscience Publishers, 1964, as well as DE-AS 1 495 626, DE-OS 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates is carried out for example by reacting diphenols with carbonic acid halides, preferably phosgene and/or with aromatic dicarboxylic acid dihalides, preferably benzenedicarboxylic acid dihalides, by the phase boundary process, optionally with the use of chain terminators, for example monophenols, and optionally with the use of trifunctional or more than trifunctional branching agents, for example triphenols or tetraphenols.

Diphenols for the production of the aromatic polycarbonates and/or aromatic polyester carbonates are preferably those of the formula (I)

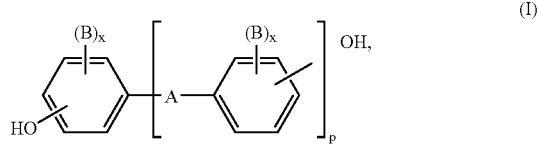

wherein
A denotes a single bond, $C_1$–$C_5$ alkylene, $C_2$–$C_5$ alkylidene, $C_5$–$C_6$ cycloalkylidene, —O—, —SO—, —CO—, —S, —$SO_2$—, $C_6$–$C_{12}$ arylene, which may be condensed with further aromatic rings optionally containing heteroatoms, or a radical of the formula (II) or (III)

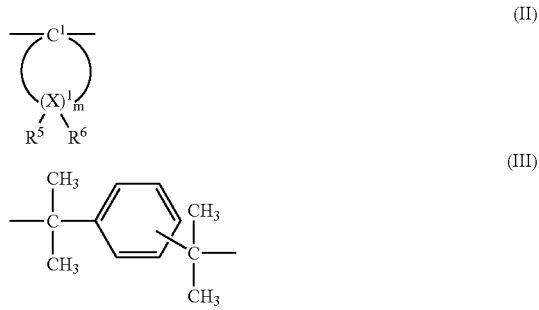

B in each case denotes $C_1$–$C_{12}$ alkyl, preferably methyl, halogen, preferably chlorine and/or bromine,
x independently of one another denotes 0, 1 or 2,
P is 0 or 1, and
$R^5$ and $R^6$ may be chosen individually for each $X^1$, and independently of one another denote hydrogen or $C_1$–$C_6$ alkyl, preferably hydrogen, methyl or ethyl,
$X^1$ is carbon, and
m is an integer from 4 to 7, preferably 4 or 5, with the proviso that on at least one atom $X^1$, $R^5$ and $R^6$ are both simultaneously alkyl.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones, and α,α-bis-(hydroxyphenyl)-diisopropyl-benzenes as well as their nuclear-brominated and/or nuclear-chlorinated derivatives.

Particularly preferred diphenols are 4,4'-dihydroxydiphenyl, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethylcyclohexane, 4,4'-dihydroxydiphenyl sulfide, 4,4'-dihydroxydiphenyl sulfone as well as their dibrominated and tetrabrominated or chlorinated derivatives, such as for example 2,2-bis-(3-chloro-4-hydroxyphenyl)-propane, 2,2-bis-(3,5-dichloro-4-hydroxyphenyl)propane or 2,2-bis-(3,5-dibromo-4-hydroxyphenyl) propane. 2,2-bis-(4-hydroxyphenyl)propane (bisphenol A) is particularly preferred.

The diphenols may be used individually or as arbitrary mixtures. The diphenols are known in the literature or can be obtained by processes known in the literature.

Suitable chain terminators for the production of the thermoplastic, aromatic polycarbonates include for example phenol, p-chlorophenol, p-tert.-butylphenol or 2,4,6-tribromophenol, as well as long-chain alkylphenols such as 4-(1,3-tetramethyl-butyl)phenol according to DE-A 2 842 005, or monoalkylphenols and/or dialkylphenols with a total of 8 to 20 carbon atoms in the alkyl substituents, such as 3,5-di-tert.-butylphenol, p-iso-octylphenol, p-tert.-octylphenol, p-dodecylphenol, and 2-(3,5-dimethylheptyl)phenol and 4-(3,5-dimethylheptyl)phenol. The amount of chain terminators used is generally between 0.5 mole % and 10 mole %, referred to the molar sum of the diphenols used in each case.

The thermoplastic aromatic polycarbonates have mean, weight average molecular weights ($M_w$, measured for example by ultracentrifugation or light-scattering measurements) of 10,000 to 200,000, preferably 15,000 to 80,000.

The thermoplastic, aromatic polycarbonates may be branched in a manner known per se, and more specifically preferably by the incorporation of 0.05 to 2.0 mole %, referred to the sum of the diphenols used, of trifunctional or more than trifunctional compounds, for example those with three or more than three phenolic groups.

Homopolycarbonates as well as copolycarbonates are suitable. For the production of copolycarbonates according to the invention, as component A there may also be used 1 to 25 wt. %, preferably 2.5 to 25 wt. % (referred to the total amount of diphenols used) of polydiorganosiloxanes with hydroxy-aryloxy terminal groups. These are known (for example U.S. Pat. No. 3,419,634) and/or can be produced by methods known in the literature. The production of polydiorganosiloxane-containing copolycarbonates is described for example in DE-OS 3 334 782.

Preferred polycarbonates include, in addition to bisphenol A homopolycarbonates, also the copolycarbonates of bisphenol A with up to 15 mole %, referred to the molar sums of diphenols, of diphenols other than preferred and/or particularly preferred diphenols, especially up to 15 mole % of 2,2-bis(3,5-dibromo-4-hydroxy-phenyl)propane.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a ratio of between 1:20 and 20:1. In the production of polyester carbonates a carbonic acid halide, preferably phosgene, is in addition co-used as bifunctional acid derivative.

Suitable chain terminators for the production of the aromatic polyester carbonates Include, apart from the already mentioned monophenols, also their chlorinated carbonic acid esters as well as the acid chlorides of aromatic monocarboxylic acids, which may optionally be substituted by $C_1$–$C_{22}$ alkyl groups or by halogen atoms, as well as aliphatic $C_2$–$C_{22}$ monocarboxylic acid chlorides.

The amount of chain terminators is in each case 0.1 to 10 mole %, referred in the case of phenolic chain terminators to moles of diphenols, and in the case of monocarboxylic acid chloride chain terminators to moles of dicarboxylic acid dichlorides.

The aromatic polyester carbonates may also include incorporated aromatic hydroxycarboxylic acids.

The aromatic polyester carbonates may be linear as well as branched in a manner known per se (see in this connection also DE-A 2 940 024 and DE-A 3 007 934).

As branching agents there may be used for example trifunctional or polyfunctional carboxylic acid chlorides such as trimesic acid trichloride, cyanuric acid trichloride, 3,3'-4,4'-benzophenone tetracarboxylic acid tetrachloride, 1,4,5,8-naphthalene-tetracarboxylic acid tetrachloride or pyromellitic acid tetrachloride in amounts of 0.01 to 1.0 mole % (referred to the dicarboxylic acid dichlorides that are used), or trifunctional or polyfunctional phenols such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)-propane, tetra-(4-[4-hydroxyphenylisopropyl]-phenoxy)-methane, 1,4-bis-[4,4'-dihydroxytriphenyl)-methyl]-benzene, in amounts of 0.01 to 1.0 mole %, referred to the diphenols that are used. Phenolic branching agents may be added together with the diphenols, while acid chloride branching agents may be added together with the acid dichlorides.

In the thermoplastic, aromatic polyester carbonates the proportion of carbonate structural units may be varied as desired. Preferably the proportion of carbonate groups is up to 100 mole %, in particular up to 80 mole %, particularly preferably up to 50 mole %, referred to the sum total of ester groups and carbonate groups. The ester fraction as well as the carbonate fraction of the aromatic polyester carbonates may be present in the form of blocks or may be statistically distributed in the polycondensate.

The relative solution viscosity ($\eta_{rel.}$) of the aromatic polycarbonates and polyester carbonates is in the range 1.18 to 1.4, preferably 1.20 to 1.32 (measured in solutions containing 0.5 g of polycarbonate or polyester carbonate in 100 ml of methylene chloride solution at 25° C.).

The thermoplastic, aromatic polycarbonates and polyester carbonates may be used alone or in arbitrary mixtures with one another. They may be contained in the compositions according to the invention in an amount of preferably 5 to 95 parts by weight, particularly preferably 10 to 90 parts by weight, most particularly preferably 20 to 80 parts by weight, and especially preferably 45 to 80 parts by weight.

Component B

The component B comprises one or more graft polymers of

B.1 5 to 95 wt. %, preferably 30 to 90 wt. %, of at least one vinyl monomer on

B.2 95 to 5 wt. %, preferably 70 to 10 wt. %, of one or more graft bases having glass transition temperatures of <10° C., preferably <0° C., particularly preferably <−20° C.

The graft base B.2 generally has a mean particle size ($d_{50}$ value) of 0.05 to 10 μm, preferably 0.1 to 5 μm, particularly preferably 0.2 to 1 μm.

Monomers B.1 are preferably mixtures of

B.1.1 50 to 99 parts by weight of vinyl aromatic compounds and/or nuclear-substituted vinyl aromatic compounds (such as for example styrene, α-methylstyrene, p-methylstyrene, p-chlorostyrene) and/or methacrylic acid ($C_1$–$C_8$) alkyl esters (such as methyl methacrylate, ethyl methacrylate) and B.1.2 1 to 50 parts by weight of vinyl cyanides (unsaturated nitriles such as acrylonitrile and methacrylonitrile) and/or (meth)acrylic acid ($C_1$–$C_8$) alkyl esters (such as methyl methacrylate, n-butyl acrylate, tert.-butyl acrylate) and/or derivatives (such as anhydrides and imides) of unsaturated carboxylic acids (for example maleic anhydride and N-phenylmaleimide).

Preferred monomers B.1.1 are selected from at least one of the monomers styrene, α-methylstyrene and methyl methacrylate, and preferred monomers B.1.2 are selected from at least one of the monomers acrylonitrile, maleic anhydride and methyl methacrylate.

Particularly preferred monomers are B.1.1 styrene and B.1.2 acrylonitrile.

For the graft polymers B suitable graft bases B.2 are for example diene rubbers, EP(D)M rubbers, i.e. those based on ethylene/propylene and optionally diene, acrylate, polyurethane, silicone, chloroprene and ethylene/vinyl acetate rubbers.

Preferred graft bases B.2 are diene rubbers (for example based on butadiene, isoprene) or mixtures of diene rubbers or copolymers of diene rubbers or their mixtures with further copolymerisable monomers (e.g. according to B.1.1 and B.1.2), with the proviso that the glass transition temperature of the component B.2 is below 10° C., preferably below 0° C., particularly preferably below −10° C.

Pure polybutadiene rubber is particularly preferred.

Particularly preferred polymers B are for example ABS polymers (emulsion, bulk and suspension ABS), such as are described for example in DE-A 2 035 390 (=U.S. Pat. No. 3,644,574) or in DE-A 2 248 242 (=GB-PS 1 409 275) or in Ullmanns, Enzyklopädie der Technischen Chemie, Vol. 19 (1980), p. 280 ff. The gel content of the graft base B.2 is at least 30 wt. %, preferably at least 40 wt. % (measured in toluene).

The graft copolymers B are produced by free-radical polymerisation, e.g. by emulsion, suspension, solution or bulk polymerisation, preferably by emulsion or bulk polymerisation.

Particularly suitable graft rubbers are also ABS polymers that are produced by redox initiation with an initiator system of organic hydroperoxide and ascorbic acid according to U.S. Pat. No. 4,937,285.

Since in the graft reaction the graft monomers are not, as is known, necessarily completely grafted onto the graft base, according to the invention the expression graft polymers B is also understood to include those products that are obtained by (co)polymerisation of the graft monomers in the presence of the graft base and that occur with it during the working-up.

Suitable acrylate rubbers according to B.2 of the polymers B are preferably polymers of acrylic acid alkyl esters, optionally with up to 40 wt. %, referred to B.2, of other polymerisable, ethylenically unsaturated monomers. The preferred polymerisable acrylic acid esters include $C_1$–$C_8$ alkyl esters, for example methyl, ethyl, butyl, n-octyl and 2-ethylhexyl esters; halogenated alkyl esters, preferably halogenated-$C_1$–$C_8$-alkyl esters such as chloroethyl acrylate, as well as mixtures of these monomers.

Monomers with more than one polymerisable double bond may be co-polymerised for the crosslinking. Preferred examples of crosslinking monomers are esters of unsaturated monocarboxylic acids with 3 to 8 C. atoms and unsaturated monohydric alcohols with 3 to 12 C. atoms or saturated polyols with 2 to 4 OH groups and 2 to 20 C. atoms, such as ethylene glycol dimethacrylate, allyl methacrylate; multiply unsaturated heterocyclic compounds, such as trivinyl cyanurate and triallyl cyanurate; polyfunctional vinyl compounds such as divinylbenzenes and trivinylbenzenes; as well as triallyl phosphate and diallyl phthalate.

Preferred crosslinking monomers include allyl methacrylate, ethylene glycol dimethacrylate, diallyl phthalate and heterocyclic compounds that contain at least 3 ethylenically unsaturated groups.

Particularly preferred crosslinking monomers are the cyclic monomers triallyl cyanurate, triallyl isocyanurate, triacryloylhexahydro-s-triazine, and triallylbenzenes. The amount of the crosslinking monomers is preferably 0.02 to 5 wt. %, in particular 0.05 to 2 wt. %, referred to the graft base B.2.

In the case of cyclic crosslinking monomers containing at least 3 ethylenically unsaturated groups, it is advantageous to restrict the amount to below 1 wt. % of the graft base B.2.

Preferred "other" polymerizable ethylenically unsaturated monomers that in addition to the acrylic acid esters may optionally serve for the production of the graft base B.2 include for example acrylonitrile, styrene, α-methylstyrene, acrylamides, vinyl $C_1$–$C_6$ alkyl ethers, methyl methacrylate, and butadiene. Preferred acrylate rubbers as graft base B.2 are emulsion polymers that have a gel content of at least 60 wt. %.

Further suitable graft bases according to B.2 are silicone rubbers with graft-active sites, such as are described in DE-A 3 704 657, DE-A 3 704 655, DE-A 3 631 540 and DE-A 3 631 539.

The gel content of the graft base B.2 is measured at 25° C. in a suitable solvent (M. Hoffmann, H. Krömer, R. Kuhn, Polymeranalysis I and II, Georg Thieme-Verlag, Stuttgart 1977).

The mean particle diameter $d_{50}$ is the diameter above and below which in each case 50 wt. % of the particles lie, and may be determined by means of ultracentrifuge measurements (W. Scholtan, H. Lange, Kolloid, Z. and Z. Polymere 250 (1972), 782–796).

The component B may be contained in the compositions according to the invention in an amount of preferably 1 to 60 parts by weight, particularly preferably 1 to 40 parts by weight, and most particularly preferably 2 to 30 parts by weight.

Component C

The component C comprises one or more thermoplastic vinyl (co)polymers C.1 and/or polyalkylene terephthalates C.2.

Suitable as vinyl (co)polymers C.1 are polymers of at least one monomer from the group comprising vinyl aromatic compounds, vinyl cyanides (unsaturated nitriles), (meth)acrylic acid ($C_1$–$C_8$) alkyl esters, unsaturated carboxylic acids as well as derivatives (such as anhydrides and imides) of unsaturated carboxylic acids. Particularly suitable are (co)polymers of C.1.1 50 to 99 parts by weight, preferably 60 to 80 parts by weight of vinyl aromatic compounds and/or nuclear-substituted vinyl aromatic compounds (such as for example styrene, α-methylstyrene, p-methylstyrene, p-chlorostyrene) and/or methacrylic acid ($C_1$–$C_8$) alkyl esters (such as for example methyl methacrylate, ethyl methacrylate), and C.1.2 1 to 50 parts by weight, preferably 20 to 40 parts by weight of vinyl cyanides (unsaturated nitriles) such as acrylonitrile and methacrylonitrile and/or (meth)acrylic acid ($C_1$–$C_8$) alkyl esters (such as methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers C.1 are resin-like, thermoplastic and rubber-free.

Particularly preferred is the copolymer of C.1.1 styrene and C.1.2 acrylonitrile.

The (co)polymers according to C.1 are known and can be produced by free-radical polymerisation, in particular by emulsion, suspension, solution or bulk polymerisation. The (co)polymers preferably have mean molecular weights $M_w$ (weight average, determined by light scattering or sedimentation) of between 15,000 and 200,000.

The polyalkylene terephthalates of the component C.2 are reaction products of aromatic dicarboxylic acids or their reactive derivatives, such as dimethyl esters or anhydrides, and aliphatic, cycloaliphatic or araliphatic diols as well as mixtures of these reaction products.

Preferred polyalkylene terephthalates contain at least 80 wt. %, preferably at least 90 wt. %, referred to the dicarboxylic acid component, of terephthalic acid radicals, and at least 80 wt. %, preferably at least 90 mole %, referred to the diol component, of ethylene glycol radicals and/or butanediol-1,4 radicals.

The preferred polyalkylene terephthalates may contain, in addition to terephthalic acid radicals, also up to 20 mole %, preferably up to 10 mole %, of radicals of other aromatic or cycloaliphatic dicarboxylic acids with 8 to 14° C. atoms or aliphatic dicarboxylic acids with 4 to 12° C. atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene glycol radicals or butanediol-1,4 radicals, also up to 20 mole %, preferably up to 10 mole %, of other aliphatic diols with 3 to 12° C. atoms or cycloaliphatic diols with 6 to 21° C. atoms, for example radicals of propanediol-1,3,2-ethylpropanediol-1,3, neopentyl glycol, pentanediol-1,5, hexanediol-1,6, cyclohexanedimethanol-1,4,3-ethylpentanediol-2,4,2-methylpentanediol-2,4, 2,2,4-trimethylpentanediol-1,3, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(4-β-hydroxyethoxyphenyl)-propane and 2,2-bis-(4-hydroxypropoxyphenyl)-propane (DE-OS 2 407 674,2 407 776, 2 715 932).

The polyalkylene terephthalates may be branched by incorporating relatively small amounts of trihydric or tetrahydric alcohols or tribasic or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particularly preferred are polyalkylene terephthalates that have been produced simply from terephthalic acid and its reactive derivatives (for example its dialkyl esters) and ethylene glycol and/or butanediol-1,4, and mixtures of these polyalkylene terephthalates.

Mixtures of polyalkylene terephthalates contain 1 to 50 wt %, preferably 1 to 30 wt. %, of polyethylene terephthalate, and 50 to 99 wt. %, preferably 70 to 99 wt. %, of polybutylene terephthalate.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscosimeter.

The polyalkylene terephthalates can be produced by methods known per se (see for example Kunststoff-Handbuch, Vol. VIII, p. 695 ff, Carl-Hanser-Verlag, Munich 1973).

The component C may be contained in the compositions according to the invention in an amount of preferably 0 to 50 parts by weight, particularly preferably up to 30 parts by weight, and most particularly preferably up to 20 parts by weight.

Component D

The compositions may be rendered flame-resistant by adding suitable additives. Examples of flame-proofing agents are halogen compounds, in particular based on chlorine and bromine, as well as phosphorus-containing compounds.

Preferably the compositions contain phosphorus-containing flame-proofing agents from the groups comprising oligomeric phosphoric and phosphonic acid esters, phosphonate amines and phosphazenes, wherein mixtures of several components selected from one or various of these groups may also be used as flame-proofing agents. Also, other phosphorus compounds not specifically mentioned here may be used alone or in arbitrary combination with other flame-proofing agents.

Preferred monomeric and oligomeric phosphoric and/or phosphonic acid esters are phosphorus compounds of the general formula (IV)

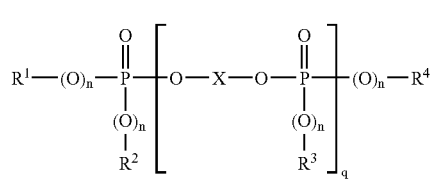

wherein
$R^1$, $R^2$, $R^3$ and $R^4$, independently of one another in each case denote optionally halogenated $C_1$–$C_8$ alkyl, $C_5$ to $C_6$ cycloalkyl, $C_6$ to $C_{20}$ aryl or $C_7$ to $C_{12}$ aralkyl in each case optionally substituted by alkyl, preferably $C_1$ to $C_4$ alkyl, and/or halogen, preferably chlorine or bromine,
n independently of one another is 0 or 1
q is a number from 0 to 30, and
X denotes a mononuclear or polynuclear aromatic radical with 6 to 30 C atoms, or a linear or branched aliphatic radical with 2 to 30 C atoms, which may be OH-substituted and may contain up to 8 ether bonds.

Preferably $R^1$, $R^2$, $R^3$ and $R^4$ independently of one another denote $C_1$–$C_4$ alkyl, phenyl, naphthyl or phenyl-$C_1$–$C_4$-alkyl. The aromatic groups $R^1$, $R^2$, $R^3$ and $R^4$ may in turn be substituted by halogen and/or alkyl groups, preferably chlorine, bromine and/or $C_1$–$C_4$ alkyl. Particularly preferred aryl radicals are cresyl, phenyl, xylenyl, propylphenyl or butylphenyl, as well as the corresponding brominated and chlorinated derivatives thereof.

X in the formula (IV) preferably denotes-a mononuclear or polynuclear aromatic radical with 6 to 30 C atoms. This is preferably derived from diphenols of the formula (I).
n in the formula (IV) may, independently of one another, be 0 or 1, and n is preferably equal to 1.
q denotes values from 0 to 30. When using mixtures of various components of the formula (IV), mixtures may preferably be used having numerically averaged q values of 0.3 to 20, particularly preferably 0.5 to 10, especially 0.5 to 6.
X preferably denotes

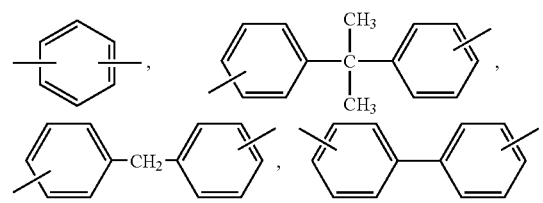

or their chlorinated or brominated derivatives, and X is in particular derived from resorcinol, hydroquinone, bisphenol A or diphenylphenol. Particularly preferably X is derived from bisphenol A.

The use of oligomeric phosphoric acid esters of the formula (IV) that are derived from bisphenol A is particularly advantageous since the compositions containing this phosphorus compound have a particularly high stress crack resistance and hydrolysis resistance as well as a particularly low tendency to form coatings in injection molding processing. Furthermore a particularly high thermal resistance can be achieved with these flame-proofing agents.

Further preferred phosphorus-containing compounds are compounds of the formula (IVa)

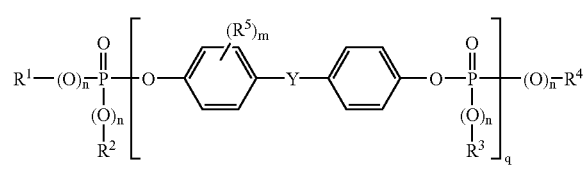

wherein
$R^1$, $R^2$, $R^3$ and $R^4$ in each case independently of one another denote $C_1$ to $C_8$ alkyl and/or $C_5$ to $C_6$ cycloalkyl, $C_6$ to $C_{10}$ aryl or $C_7$ to $C_{12}$ aralkyl optionally substituted by alkyl,
n independently of one another is 0 or 1,
m independently of one another is 0, 1, 2, 3 or 4,
q is a number between 0 and 30,
$R^5$ and $R^6$ independently of one another denote $C_1$ to $C_4$ alkyl, and
Y denotes $C_1$ to $C_7$ alkylidene, $C_1$ to $C_7$ alkylene, $C_5$ to $C_{12}$ cycloalkylene, $C_5$ to $C_{12}$ cycloalkylidene, —O—, —S—, —SO—, $SO_2$ or —CO—.

As component D according to the invention there may be used monophosphates (q=0), oligophosphates (q=1–30) or mixtures of monophosphates and oligophosphates.

Monophosphorus compounds of the formula (IV) are in particular tributyl phosphate, tris-(2-chloroethyl)-phosphate, tris-(2,3-dibromopropyl)-phosphate, triphenyl phosphate, tricresyl phosphate, diphenylcresyl phosphate, diphenyloctyl phosphate, diphenyl-2-ethylcresyl phosphate, tri-(isopropylphenyl)-phosphate, halogen-substituted aryl phosphates, methyl phosphonic acid dimethyl ester, methyl phosphenic acid diphenyl ester, phenylphosphonic acid diethyl ester, triphenylphosphine oxide or tricresylphosphine oxide.

The phosphorus compounds according to component D, formula (IV) are known (see for example EP-A 0 363 608, EP-A 0 640 655) or can be produced in a similar manner by known methods (e.g. Ullmanns Enzyklopädie der Technischen Chemie, Vol. 18 (1980), p. 301 ff. 1979; Houben-Weyl, Methoden der Organischen Chemie, Vol. 12/1, p. 43; Beilstein Vol. 6, p. 177).

The mean q values may be found by determining the composition of the phosphate mixture (molecular weight distribution) by means of suitable methods (gas chromatography (GC), high pressure liquid chromatography (HPLC), gel permeation chromatography (GPC)) from which the mean values for q are then calculated.

Phosphonate amines are preferably compounds of the formula (V)

(V)

in which

A denotes a radical of the formula (Va)

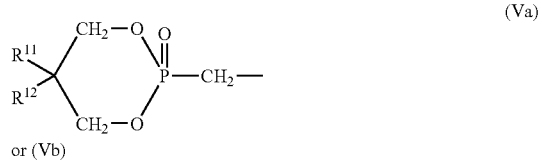

(Va)

or (Vb)

(Vb)

$R^{11}$ and $R^{12}$ independently of one another denote unsubstituted or substituted $C_1$ to $C_{10}$ alkyl or denote unsubstituted or substituted $C_6$ to $C_{10}$ aryl, $R^{13}$ and $R^{14}$ independently of one another denote unsubstituted or substituted $C_1$ to $C_{10}$ alkyl or unsubstituted or substituted $C_6$ to $C_{10}$ aryl, or $R^{13}$ and $R^{14}$ together denote unsubstituted or substituted $C_3$ to $C_{10}$ alkylene, y denotes the numerical values 0, 1 or 2, and $B^1$ independently denotes hydrogen, optionally halogenated $C_2$ to $C_8$ alkyl, unsubstituted or substituted $C_6$ to $C_{10}$ aryl.

$B^1$ preferably independently denotes hydrogen, ethyl, n-propyl or iso-propyl, which may be substituted by halogen, unsubstituted $C_6$ to $C_{10}$ aryl or $C_6$ to $C_{10}$ aryl substituted by $C_1$ to $C_4$ alkyl and/or halogen, in particular phenyl or naphthyl.

Alkyl in $R^{11}$, $R^{12}$, $R^{13}$ and $R^{14}$ independently preferably denotes methyl, ethyl, n-propyl, iso-propyl, n-, iso-, sec.- or tert.-butyl, pentyl or hexyl.

Substituted alkyl in $R^{11}$, $R^{12}$, $R^{13}$ and $R^{14}$ independently preferably denotes $C_1$ to $C_{10}$ alkyl substituted by halogen, in particular singly or doubly substituted methyl, ethyl, n-propyl, iso-propyl, n-, iso-, sec.- or tert.-butyl, pentyl or hexyl.

$C_6$ to $C_{10}$ aryl in $R^{11}$, $R^{12}$, $R^{13}$ and $R^{14}$ independently preferably denotes phenyl, naphthyl or binaphthyl, in particular o-phenyl, o-napthyl, o-binapthyl, which may be substituted by halogen (in general singly, doubly or triply substituted).

$R^{13}$ and $R^{14}$ may together with the oxygen atoms to which they are directly bound and the phosphorus atom, form a ring structure.

The following compounds may be mentioned by way of example and preferably: 5,5,5',5',5'',5''-hexamethyltris(1,3,2-dioxaphosphorinanemethane)amino-2,2',2''-trioxide of the formula (Va-1)

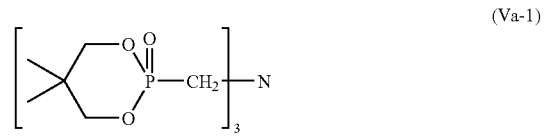

(Va-1)

(experimental product XPM 1000, Solutia Inc., St Louis, USA) 1,3,2-dioxaphos-phorinane-2-methanamine, N-butyl-N[(5,5-dimethyl-1,3,2-dioxaphosphorinan-2-yl)methyl]-5,5-dimethyl-, P,2-dioxide; 1,3,2-dioxaphosphorinane-2-methanamine, N-[(5,5-dimethyl-1,3,2-dioxaphosphorinan-2-yl)methyl]-5,5-dimethyl-N-phenyl,-P,2-dioxide; 1,3,2-dioxaphosphorinane-2-methanamine, N,N-dibutyl-5,5-dimethyl-, 2-oxide, 1,3,2-dioxaphosphorinane-2-methanimine, N[(5,5-dimethyl-1,3,2-dioxaphosphorinan-2-yl)methyl]-N-ethyl-5,5-dimethyl,-P,2-dioxide, 1,3,2-dioxaphos-phorinane-2-methanamine, N-butyl-N-[(5,5-dichloromethyl-1,3,2-dioxaphos-phorinane-2-yl)-methyl]-5,5-di-chloromethyl-, P,2-dioxide, 1,3,2-dioxaphos-phorinane-2-methanamine, N[(5,5-di-chloromethyl-1,3,2-dioxaphosphorinan-2-yl)-methyl]-5,5-di-chloromethyl-N-phenyl-, P,2-dioxide; 1,3,2-dioxaphosphorinane-2-methanamine, N,N-di-(4-chlorobutyl)-5,5-dimethyl-2-oxide; 1,3,2-dioxaphos-phorinane-2-methanimine, N[(5,5-dimethyl-1,3,2-dioxaphosphorinan-2-yl)-methane]-N-(2-chloroethyl)-5,5-di(chloromethyl)-, P,2-dioxide.

Also preferred are:

compounds of the formulae (Va-2) or (Va-3)

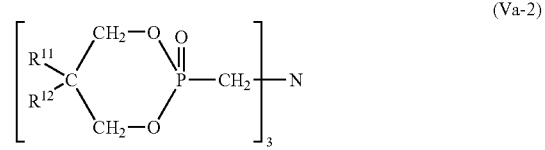

(Va-2)

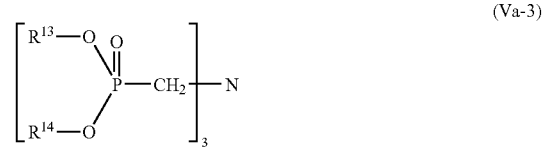

(Va-3)

wherein $R^{11}$, $R^{12}$, $R^{13}$ and $R^{14}$ have the meanings given above.

Particularly preferred are compounds of the formulae (Va-2) and (Va-1).

The production of the phosphonate amines is described for example in U.S. Pat. No. 5,844,028.

Phosphazenes are compounds of the formulae (VIa) and (VIb)

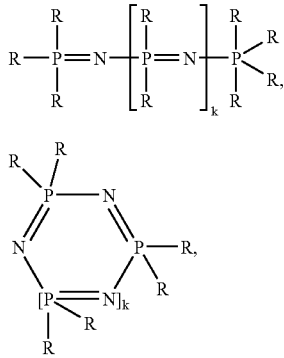

wherein
R in each case is identical or different and denotes amino, $C_1$ to $C_8$ alkyl or $C_1$ to $C_8$ alkoxy in each case optionally halogenated, preferably halogenated with fluorine, $C_5$ to $C_6$ cycloalkyl in each case optionally substituted by alkyl, preferably $C_1$ to $C_4$ alkyl, and/or by halogen, preferably chlorine and/or bromine, $C_6$ to $C_{20}$ aryl, preferably phenyl or naphthyl, $C_6$ to $C_{20}$ aryloxy, preferably phenoxy, naphthyloxy, or $C_7$ to $C_{12}$ aralkyl, preferably phenyl-$C_1$–$C_4$-alkyl,
k denotes 0 or a number from 1 to 15, preferably a number from 1 to 10.

By way of example there may be mentioned propoxyphosphazene, phenoxyphosphazene, methylphenoxyphosphazene, aminophosphazene and fluoroalkylphosphazenes. Phenoxyphosphazene is particularly preferred.

The phosphazenes may be used alone or as a mixture. The radical R may always be the same, or two or more radicals in the formulae (1a) and (1b) may be different.

Phosphazenes and their preparation are described for example in EP-A 0 728 811, DE-A 1961668 and WO 97/40092.

The flame-proofing agents may be used individually or in arbitrary mixtures with one another or mixed with other flame-proofing agents.

The component D may be contained in the composition according to the invention in an amount of preferably 0.5 to 20 parts by weight, particularly preferably 1 to 18 parts by weight and most particularly preferably 2 to 15 parts by weight.

Component E

The polycarbonate compositions moreover contain the aforementioned inorganic materials having an anisotropic particle geometry.

Preferably inorganic materials having a flake-like or plate-like character may be used, such as talcum, mica/clay bank minerals, montmorillonite, the latter also in an organophilic form modified by ion exchange, as well as kaolin and vermiculite. The inorganic materials may be surface treated, for example silanised, in order to ensure a better polymer compatibility.

Talcum is particularly preferred. Talcum is understood to include both a naturally occurring talcum and synthetically produced talcum. Pure talcum has the chemical composition $3MgO \cdot 4SiO_2 \cdot H_2O$ and thus has an MgO content of 31.9 wt. %, an $SiO_2$ content of 63.4 wt. %, and a content of chemically bound water of 4.8 wt. %. Talcum is a silicate with a layered structure.

Naturally occurring talcum materials in general do not have the ideal composition specified above since they are contaminated by partial replacement of the magnesium by other elements, by partial replacement of silicon by for example aluminium, and/or by intergrowths with other minerals such as dolomite, magnesite and chlorite. Although these contaminated natural talcum powders may be used in the composition according to the invention, nevertheless high purity forms of talcum are preferred. These have for example an MgO content of 28 to 35 wt. %, preferably 30 to 33 wt. %, particularly preferably 30.5 to 32 wt. %, and an $SiO_2$ content of 55 to 65 wt. %, preferably 58 to 64 wt. %, particularly preferably 60 to 62.5 wt. %. Preferred types of talcum are furthermore characterized by an $Al_2O_3$ content of <5 wt. %, particularly preferably <1 wt. %, especially <0.7 wt. %.

For the purposes of the present invention the iron content of the talcum should be as low as possible, for example <0.5 wt. %, in particular <0.3 wt. %, particularly preferably <0.2 wt. %.

It is also advantageous in particular to use talcum in the form of finely ground types having a mean largest particle size $d_{50}$ of <10 µm, preferably <5 µm, particularly preferably <2.5 µm, and most especially preferably ≦1.5 µm.

The inorganic materials of the component E may be contained in the compositions according to the invention in an amount of preferably 0.1 to 30 parts by weight, particularly preferably 0.2 to 20 parts by weight, and most particularly preferably 0.5 to 15 parts by weight.

Component F

The flame-proofing agents according to component D are often used in combination with so-called anti-drip agents, which reduce the tendency of the material to form burning droplets in the event of a fire. By way of example there may be mentioned here compounds of the classes of substances comprising fluorinated polyolefins, silicones as well as aramide fibres. These may also be employed in the compositions according to the invention. Fluorinated polyolefins are preferably used as anti-drip agents.

Fluorinated polyolefins are known and are described for example in EP-A 0 640 655. They are marketed under the trade name Teflon® 30N by DuPont.

The fluorinated polyolefins may be used in pure form as well as in the form of a coagulated mixture of emulsions of the fluorinated polyolefins with emulsions of the graft polymers (component B) or with an emulsion of a copolymer, preferably based on styrene-acrylonitrile, the fluorinated polyolefin being mixed as an emulsion with an emulsion of the graft polymer or copolymer and then coagulated.

Furthermore the fluorinated polyolefins may be used as a pre-compound with the graft polymer (component B) or with a copolymer, preferably based on styrene/acrylonitrile. The fluorinated polyolefins are mixed as powder with a powder or granules of the graft polymer or copolymer and are compounded in the melt generally at temperatures of 200° to 330° C. in conventional units such as internal kneaders, extruders or double-shaft screw extruders.

The fluorinated polyolefins may also be used in the form of a master batch that is produced by emulsion polymerisation of at least one monoethylenically unsaturated monomer in the presence of an aqueous dispersion of the fluorinated polyolefin. Preferred monomer components are styrene, acrylonitrile and their mixtures. The polymer is employed as a free-flowing powder after precipitation with acid and subsequent drying.

The coagulates, pre-compounds or master batches normally have solids contents of fluorinated polyolefin of 5 to 95 wt. %, preferably 7 to 60 wt. %.

The component F may be contained in the composition according to the invention in an amount of preferably 0.05 to 5 parts by weight, particularly preferably 0.1 to 1 part by weight and most particularly preferably 0.1 to 0.5 part by weight.

The sum total of the parts by weight of all components is 100.

G. Further Additives

The molding compositions according to the invention may furthermore contain at least one of the conventional additives such as lubricants and mould release agents, for example pentaerythritol tetrastearate, nucleating agents, antistatics, stabilisers, and in addition to the inorganic materials with the chosen aspect ratio, may moreover contain inorganic materials of a different geometry, such as further fillers and reinforcing agents as well as dyes and pigments.

The molding compositions according to the invention may contain up to 35 wt. %, referred to the total molding composition, of a further, optionally synergistically acting flame-proofing agent. Examples of further flame-proofing agents that may be mentioned include organic halogentated compounds such as decabromobisphenyl ether, tetrabromobisphenol, inorganic halogenated compounds such as ammonium bromide, nitrogen compounds such as melamine, melamine-formaldehyde resins, inorganic hydroxides such as Mg hydroxide or Al hydroxide, inorganic compounds such as antimony oxides, barium metaborate, hexahydroxoantimonate, zirconium oxide, zirconium hydroxide, molybdenum oxide, ammonium molybdate, zinc borate, ammonium borate, barium metaborate, talcum, silicate, silicon oxide and tin oxide, as well as siloxane compounds.

The molding compositions according to the invention are produced by mixing the respective constituents in a known manner and melt-compounding and melt-extruding them at temperatures of 200° C. to 300° C. in conventional units such as internal kneaders, extruders and double-shaft screw extruders.

The mixing of the individual constituents may be performed successively as well as simultaneously, and more specifically at about 20° C. (room temperature) as well as at higher temperatures.

The molding compositions according to the invention may be used to produce all types of molded articles. These articles may be produced by injection molding, extrusion and blow molding processes. A further type of processing is the production of molded articles by thermoforming previously fabricated sheets or films.

Examples of such molded articles are films, profiled sections, all types of housing parts, e.g. for domestic appliances such as juice presses, coffee-making machines, mixers; for office equipment such as monitors, printers, copiers; for sheets, pipes, electrical installation ducting, windows, doors and further profiled sections for the building and construction sector (internal and external applications) as well as electrical and electronics parts such as switches and plugs.

Furthermore the molding compositions according to the invention may for example be used to produce the following molded articles or molded parts:

1. Internal structural parts for rail vehicles, ships, aircraft, buses and other vehicles
2. Wheelcaps
3. Housings for electrical equipment containing small transformers
4. Housings for equipment for information distribution and transmission
5. Housings and casings for medical purposes
6. Massage equipment and housings therefor
7. Children's toys
8. Two-dimensional wall elements
9. Housings for safety devices
10. Rear spoilers, vehicle body parts
11. Thermally insulated transporting containers
12. Devices for holding or looking after small animals
13. Molded parts for sanitaryware and bathroom fittings
14. Cover gratings for ventilation openings
15. Molded parts for garden sheds and tool sheds
16. Housings for garden tools.

The following examples serve to illustrate the invention further.

EXAMPLES

The components listed in Table 1 and briefly described hereinafter are compounded in a 3 1 capacity internal kneader or in an ZSK-25 unit at about 240° C. The molded articles are produced in an Arburg 270 E type injection molding machine at 240°/260° C.

Component A1

Linear polycarbonate based on bisphenol A with a relative solution viscosity of 1.24 measured in $CH_2Cl_2$ as solvent at 25° C. and at a concentration of 0.5 g/100 ml.

Component A2

Linear polycarbonate based on bisphenol A with a relative solution viscosity of 1.28 measured in $CH_2Cl_2$ as solvent at 25° C. and at a concentration of 0.5 g/100 ml.

Component B

Graft polymer of 40 parts by weight of a copolymer of styrene and acrylonitrile in a ratio of 73:27 on 60 parts by weight of particulate crosslinked polybutadiene rubber (mean particle diameter $d_{50}$=0.3 μm) produced by emulsion polymerisation.

Component C

Styrene/acrylonitrile copolymer with a styrene/acrylonitrile weight ratio of 72:28 and an intrinsic viscosity of 0.55 dl/g (measured in dimethylformamide at 20° C.).

Component D
Bisphenol A-based oligophosphate

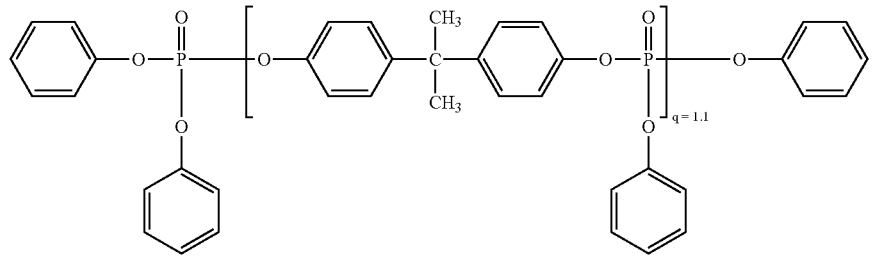

Component E1
Talcum with a mean particle diameter ($d_{50}$) according to the manufacturer's specification of 0.9 μm, a total iron content of 0.14 wt. %, and a content of acid-soluble iron of 0.11 wt. %.

Component E2
Talcum with a mean particle diameter ($d_{50}$) according to the manufacturer's specification of 1.0 μm, a total iron content of 1.30 wt. %, and a content of acid-soluble iron of 0.14 wt. %.

Component E3
Talcum with a mean particle diameter ($d_{50}$) according to the manufacturer's specification of 1.2 μm, a total iron content of 0.06 wt. %, and a content of acid-soluble iron of 0.01 wt. %.

Component E4
Talcum with a mean particle diameter ($d_{50}$) according to the manufacturer's specification of 1.2 μm, a total iron content of 0.98 wt. %, and a content of acid-soluble iron of 0.03 wt. %.

Component E5
Talcum with a mean particle diameter ($d_{50}$) according to the manufacturer's specification of 1.3 μm, a total iron content of 0.99 wt. %, and a content of acid-soluble iron of 0.03 wt. %.

Component E6
Talcum with a mean particle diameter ($d_{50}$) according to the manufacturer's specification of 1.3 μm, a total iron content of 1.05 wt. %, and a content of acid-soluble iron of 0.03 wt. %.

Component E7
Talcum with a mean particle diameter ($d_{50}$) according to the manufacturer's specification of 1.2 μm, a total iron content of 1.00 wt. %, and a content of acid-soluble iron of 0.05 wt. %.

Component E8
Talcum with a mean particle diameter ($d_{50}$) according to the manufacturer's specification of 2.1 μm, a total iron content of 0.07 wt. %, and a content of acid-soluble iron of 0.04 wt. %.

Component E9
Talcum with a mean particle diameter ($d_{50}$) according to the manufacturer's specification of 1.8 μm, a total iron content of 0.42 wt. %, and a content of acid-soluble iron of 0.03 wt. %.

Component E10
Talcum with a mean particle diameter ($d_{50}$) according to the manufacturer's specification of 1.9 μm, a total iron content of 0.96 wt. %, and a content of acid-soluble iron of 0.02 wt. %.

Component E11
Talcum with a mean particle diameter ($d_{50}$) according to the manufacturer's specification of 2.0 μm, a total iron content of 1.79 wt. %, and a content of acid-soluble iron of 0.11 wt. %.

Component E12
Talcum with a mean particle diameter ($d_{50}$) according to the manufacturer's specification of 2.5 μm, a total iron content of 0.70 wt. %, and a content of acid-soluble iron of 0.05 wt. %.

All the components E1 to E12 are ground, natural minerals with a talcum content of $\geqq 96$ wt. %. The $Al_2O_3$ content of all types is, according to the manufacturer's specifications, $\leqq 1$ wt. %.

Component F
Tetrafluoroethylene polymer as a coagulated mixture of an SAN graft polymer emulsion according to the aforementioned component B in water and a tetrafluoroethylene polymer emulsion in water. The weight ratio of graft polymer B to the tetrafluoroethylene polymer in the mixture is 90 wt. % to 10 wt. %. The tetrafluoroethylene polymer emulsion has a solids content of 60 wt. %, and the mean particle diameter is between 0.05 and 0.5 μm. The SAN graft polymer emulsion has a solids content of 34 wt. % and a mean latex particle diameter of $d_{50}=0.3$ μm.

The emulsion of the tetrafluoroethylene polymer (Teflon® 30 N from DuPont) is mixed with the emulsion of the SAN graft polymer B and stabilised with 1.8 wt. %, referred to the polymer solids, of phenolic antioxidants. The mixture is coagulated at 85° to 95° C. with an aqueous solution of $MgSO_4$ (Epsom salts) and acetic acid at pH 4 to 5, filtered and washed until practically free from electrolyte, then freed by centrifugation from the major proportion of water, and finally dried at 100° C. to form a powder.

Component G1
Phosphite stabiliser.

Component G2

Pentaerythritol tetrastearate (PETS) as mould release agent.

Iron Analysis

The determination of the iron content of the inorganic material and molding compositions containing inorganic material is carried out by optical emission spectrometry with inductively coupled plasma (ICP-OES).

In order to determine the total iron content the material is subjected to melt fusion using lithium metaborate as flux, 0.1 to 1 g of the material to be investigated together with 1.5 to 2.5 g of the flux being accurately weighed out and mixed in a platinum crucible and fused for 30 minutes at 1000° C. The melt cake is cooled, taken up in 5 ml of nitric acid and dissolved while stirring. The solution is made up to 100 ml for the ICP-OES investigation.

In order to determine the content of acid-soluble iron in the inorganic filler, about 100 mg of the filler are weighed out accurately in a glass vessel and 10 ml of a hydrochloric acid solution of concentration 1.0 mole/dm³ are added. The dispersion of the inorganic material in the hydrochloric acid solution is stirred for 24 hours at room temperature, following which the iron concentration of the supernatant solution is determined by means of ICP-OES.

Notch Impact Strength and Toughness/brittleness Transition

The determination of the notch impact strength $a_k$ is carried out according to ISO 180/1. In order to determine the temperature of the toughness/brittleness transition the notch impact strengths $a_k$ are measured and evaluated at different temperatures. Starting at room temperature, the test temperature is reduced in 5° steps until a brittle fracture is observed.

TABLE 1

Composition and Properties

| Example/Components | | 1 | V1 | 2 | V2 | V3 | V4 | V5 | 3 | 4 | V6 | V7 | 5 | V8 | 6 | V9 | 7 | V10 |
|---|---|---|---|---|---|---|---|---|---|---|---|---|---|---|---|---|---|---|
| A1 | PC1 | 65.3 | 65.3 | 65.3 | 65.3 | 65.3 | 65.3 | 65.3 | 65.3 | 65.3 | 65.3 | 65.3 | 63.2 | 63.2 | | | | |
| A2 | PC2 | | | | | | | | | | | | | | 70 | 70 | 75 | 75 |
| B | Graft | 7.0 | 7.0 | 7.0 | 7.0 | 7.0 | 7.0 | 7.0 | 7.0 | 7.0 | 7.0 | 7.0 | 4.9 | 4.9 | 17 | 17 | 18 | 18 |
| C | SAN | 6.0 | 6.0 | 6.0 | 6.0 | 6.0 | 6.0 | 6.0 | 6.0 | 6.0 | 6.0 | 6.0 | 4.9 | 4.9 | 13 | 13 | 7 | 7 |
| D | BDP | 14.6 | 14.6 | 14.6 | 14.6 | 14.6 | 14.6 | 14.6 | 14.6 | 14.6 | 14.6 | 14.6 | 12.8 | 12.8 | | | | |
| E1 | Inorganic Matl. 1 | 2.0 | | | | | | | | | | | | | | | | |
| E2 | Inorganic Matl. 2 | | 2.0 | | | | | | | | | | | | | | | |
| E3 | Inorganic Matl. 3 | | | 2.0 | | | | | | | | | 9.8 | | 8 | | 8 | |
| E4 | Inorganic Matl. 4 | | | | 2.0 | | | | | | | | | | | | | |
| E5 | Inorganic Matl. 5 | | | | | 2.0 | | | | | | | | | | | | |
| E6 | Inorganic Matl. 6 | | | | | | 2.0 | | | | | | | | | | | |
| E7 | Inorganic Matl. 7 | | | | | | | 2.0 | | | | | | 9.8 | | | | |
| E8 | Inorganic Matl. 8 | | | | | | | | 2.0 | | | | | | | | | |
| E9 | Inorganic Matl. 9 | | | | | | | | | 2.0 | | | | | | | | |
| E10 | Inorganic Matl. 10 | | | | | | | | | | 2.0 | | | | | | | |
| E11 | Inorganic Matl. 11 | | | | | | | | | | | 2.0 | | | | | | |
| E12 | Inorganic Matl. 12 | | | | | | | | | | | | | | | 8 | | 8 |
| F | Teflon Masterbatch | 4.6 | 4.6 | 4.6 | 4.6 | 4.6 | 4.6 | 4.6 | 4.6 | 4.6 | 4.6 | 4.6 | 3.9 | 3.9 | | | | |
| G1 | Stabiliser | 0.1 | 0.1 | 0.1 | 0.1 | 0.1 | 0.1 | 0.1 | 0.1 | 0.1 | 0.1 | 0.1 | 0.1 | 0.1 | 0.12 | 0.12 | 0.12 | 0.12 |
| G2 | Mould release agent | 0.4 | 0.4 | 0.4 | 0.4 | 0.4 | 0.4 | 0.4 | 0.4 | 0.4 | 0.4 | 0.4 | 0.4 | 0.4 | 0.75 | 0.75 | 0.75 | 0.75 |
| Properties: | | | | | | | | | | | | | | | | | | |
| Fe(mldg. compsn.) | [ppm] | 28 | 260 | 12 | 196 | 198 | 210 | 200 | 14 | 84 | 192 | 358 | 59 | 980 | 44 | 515 | 44 | 515 |
| $a_k$ (23° C.) | [kJ/m²] | 33 | 20 | 29 | 18 | 21 | 18 | 22 | 27 | 25 | 18 | 15 | 10 | 7 | 55 | 49 | 59 | 53 |
| Toughness/brittleness transn. | [° C.] | | | | | | | | | | | | | | −35 | −5 | −35 | −15 |

The examples in columns 1 to V7 are samples containing relatively small amounts of the inorganic material, the examples in columns 5 and V8 are samples containing relatively large amounts of inorganic material, while the example in columns 6 to V10 relate to polycarbonate blends without flame-proofing agents and without Teflon masterbatch.

The results clearly show the improved mechanical properties of the samples with reduced iron content. Surprisingly the notch impact strengths of the polycarbonate molded articles containing the inorganic materials are improved The invetntion claimed is:

1. A polycarbonate composition containing inorganic material having anisotropic particle geometry and having total iron content of at least 12 ppm and less than about 100 ppm.

2. The polycarbonate composition according to claim 1, wherein the total iron content of the composition is less than about 70 ppm.

3. The polycarbonate composition according to claim 1, wherein the total iron content of the composition is less than about 50 ppm.

4. The polycarbonate composition according to claim 1 wherein the inorganic material has an aspect ratio greater than 2.

5. The polycarbonate composition according to claim 1 wherein the inorganic material has an aspect ratio greater than about 5.

6. The polycarbonate composition according to claim 1 wherein the inorganic material is laminar.

7. The polycarbonate composition according to claim 6, wherein the inorganic material is a talcum.

8. The polycarbonate composition according to claim 1 further comprising up to 50% relative to the weight of the composition of a graft polymer of 5 to 95 percent of at least one vinyl monomer grafted on 95 to 5 percent of at least one elastomeric graft base having a glass transition temperature of less than about 10° C., said percent, both occurrences being relative to the weight of said graft polymer.

9. The polycarbonate composition according to claim 8, wherein the graft base is a member selected from the group consisting of diene, EP(D)M, acrylate and silicone rubber.

10. The polycarbonate composition according to claim 8, wherein graft polymer is an emulsion ABS or bulk ABS or mixture thereof.

11. The polycarbonate composition according to claim 1 further comprising a flame retarding agent.

12. The polycarbonate composition according to claim 11 wherein flame retarding agent is a phosphorus compound.

13. The polycarbonate composition according to claim 12, wherein phosphorus compound conforms to $$R^1-(O)_n-\overset{\overset{O}{\|}}{\underset{\underset{R^2}{|}}{\underset{(O)_n}{|}}{P}}\left[-O-X-O-\overset{\overset{O}{\|}}{\underset{\underset{R^3}{|}}{\underset{(O)_n}{|}}{P}}\right]_q (O)_n-R^4$$

wherein
$R^1$, $R^2$, $R^3$ and $R^4$, independently of one another denote $C_1-C_8$ alkyl, $C_5$ to $C_6$ cycloalkyl, $C_6$ to $C_{20}$ aryl or $C_7$ to $C_{12}$ aralkyl in each case optionally substituted by alkyl and/or halogen,
n independently of one another is 0 or 1
q is a number from 0 to 30, and
X denotes a mononuclear or polynuclear aromatic radical having 6 to 30 C atoms, or a linear or branched aliphatic radical with 2 to 30 C atoms.

14. The polycarbonate composition of claim 13 wherein X is OH— substituted.

15. The polycarbonate composition of claim 14 wherein X contains up to 8 ether bonds.

16. The polycarbonate composition according to claim 12 wherein phosphorus compound conforms to $$R^1-(O)_n-\overset{\overset{O}{\|}}{\underset{\underset{R^2}{|}}{\underset{(O)_n}{|}}{P}}\left[-O-\underset{}{\bigcirc}^{(R^5)_m}-Y-\underset{}{\bigcirc}-O-\overset{\overset{O}{\|}}{\underset{\underset{R^3}{|}}{\underset{(O)_n}{|}}{P}}\right]_q (O)_n-R^4$$

wherein
$R^1$, $R^2$, $R^3$ and $R^4$ independently of one another denote $C_1$ to $C_8$ alkyl and/or $C_5$ to $C_6$ cycloalkyl, $C_6$ to $C_{10}$ aryl or $C_7$ to $C_{12}$ aralkyl optionally substituted by alkyl,
n independently of one another is 0 or 1,
m independently of one another is 0, 1, 2, 3 or 4,
q is a number between 0 and 30,
$R^5$ and $R^6$ independently of one another denote $C_1$ to $C_4$ alkyl, and
Y denotes $C_1$ to $C_7$ alkylidene, $C_1$ to $C_7$ alkylene, $C_5$ to $C_{12}$ cycloalkylene, $C_5$ to $C_{12}$ cycloalkylidene, —O—, —S—, —SO—, $SO_2$ or —CO—.

17. A molded article containing the polycarbonate composition according to claim 1.

* * * * *